(12) United States Patent
Liang et al.

(10) Patent No.: US 11,560,331 B2
(45) Date of Patent: Jan. 24, 2023

(54) COATED GLASS ARTICLE CONTAINING A SEMI-INTERPENETRATING NETWORK

(71) Applicant: GUARDIAN GLASS, LLC, Auburn Hills, MI (US)

(72) Inventors: Liang Liang, Taylor, MI (US); Suresh Devisetti, New Hudson, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 779 days.

(21) Appl. No.: 16/432,995

(22) Filed: Jun. 6, 2019

(65) Prior Publication Data

US 2019/0375675 A1 Dec. 12, 2019

Related U.S. Application Data

(60) Provisional application No. 62/682,500, filed on Jun. 8, 2018.

(51) Int. Cl.
| | | |
|---|---|---|
| *C03C 17/00* | (2006.01) | |
| *C03C 17/32* | (2006.01) | |
| *C03C 17/30* | (2006.01) | |
| *C03C 17/04* | (2006.01) | |

(52) U.S. Cl.
CPC .......... *C03C 17/009* (2013.01); *C03C 17/007* (2013.01); *C03C 17/04* (2013.01); *C03C 17/30* (2013.01); *C03C 17/32* (2013.01); *C03C 2217/29* (2013.01); *C03C 2217/445* (2013.01); *C03C 2217/477* (2013.01); *C03C 2217/72* (2013.01)

(58) Field of Classification Search
None
See application file for complete search history.

(56) References Cited

U.S. PATENT DOCUMENTS

| | | | | |
|---|---|---|---|---|
| 5,203,902 A | * | 4/1993 | Murkens | ................... C03C 8/02 65/60.5 |
| 2012/0042694 A1 | * | 2/2012 | Brown | ................ C08F 222/102 525/308 |
| 2017/0158553 A1 | | 6/2017 | Liang et al. | |

FOREIGN PATENT DOCUMENTS

| | | | | |
|---|---|---|---|---|
| WO | WO-2015054703 A1 | * | 4/2015 | ............. C03C 17/32 |
| WO | WO-2017193157 A1 | * | 11/2017 | ........... C03C 17/007 |

OTHER PUBLICATIONS

Extended European Search Report dated Dec. 11, 2019, for EP application No. 19179152.4, 7 pages.

* cited by examiner

*Primary Examiner* — David Sample

(57) ABSTRACT

A coated glass substrate and a method of making the glass substrate is disclosed. The method comprises the following: providing a coating formulation on a glass substrate wherein the coating formulation comprises at least one polymerizable compound, a glass frit, and a non-crosslinked polymer and heating the coating formulation on the glass substrate. The coated glass substrate includes a coating provided on a surface of a glass substrate wherein the coating comprises a semi-interpenetrating polymer network including a non-crosslinked polymer and a glass frit. The coating exhibits a stud pull of about 275 psi or more.

9 Claims, No Drawings

COATED GLASS ARTICLE CONTAINING A SEMI-INTERPENETRATING NETWORK

CROSS-REFERENCE TO RELATED APPLICATION

The present application claims filing benefit of U.S. Provisional Patent Application Ser. No. 62/682,500 having a filing date of Jun. 8, 2018, and which is incorporated herein by reference in its entirety

BACKGROUND

Decorative glass is becoming more and more popular in residential, commercial, and interior applications. For instance, decorative glass is often formed by a process that involves coating a glass substrate with an organic-based paint layer and then curing the paint layer in an oven. However, many conventional organic-based paints are sensitive to corrosive materials (e.g., acids) and exhibit less than desired mechanical and adhesive properties. As such, a need continues to exist for improved decorative glass articles that are capable of exhibiting improved properties.

SUMMARY

In general, in one embodiment of the present disclosure, a method of forming a coated glass substrate is disclosed. The method comprises the following: providing a coating formulation on a glass substrate wherein the coating formulation comprises at least one polymerizable compound, a glass frit, and a non-crosslinked polymer and heating the coating formulation on the glass substrate.

In accordance with another embodiment of the present disclosure, a coated glass substrate is disclosed. The coated glass substrate comprises a coating provided on a surface of a glass substrate wherein the coating comprises a semi-interpenetrating polymer network including a non-crosslinked polymer and a glass frit. The coating exhibits a stud pull of about 275 psi or more.

DETAILED DESCRIPTION

Definitions

It is to be understood that the terminology used herein is for the purpose of describing particular embodiments only and is not intended to limit the scope of the present invention.

"Alkyl" refers to a monovalent saturated aliphatic hydrocarbyl group, such as those having from 1 to 25 carbon atoms and, in some embodiments, from 1 to 12 carbon atoms. "Cx-yalkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), neopentyl (($CH_3)_3CCH_2$), hexyl ($CH_3(CH_2CH_2CH_2)_5$), etc.

"Alkenyl" refers to a linear or branched hydrocarbyl group, such as those having from 2 to 10 carbon atoms, and in some embodiments from 2 to 6 carbon atoms or 2 to 4 carbon atoms, and having at least 1 site of vinyl unsaturation ($>C=C<$). For example, (Cx-Cy)alkenyl refers to alkenyl groups having from x to y carbon atoms and is meant to include for example, ethenyl, propenyl, 1,3-butadienyl, and so forth.

"Aryl" refers to an aromatic group, which may have from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group, which may have from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of $>C=C<$ ring unsaturation.

"Halo" or "halogen" refers to fluoro, chloro, bromo, and iodo.

"Haloalkyl" refers to substitution of an alkyl group with 1 to 5, or in some embodiments, from 1 to 3 halo groups.

"Heteroaryl" refers to an aromatic group, which may have from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group, which may have from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other groups as is known in the art. For example, an alkyl, alkenyl, alkynyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, epoxy, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, oxy, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

Detailed Description

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to an article that contains a glass substrate and a coating provided on a surface of the substrate. The coating includes an interpenetrating polymer network with a non-crosslinked polymer and a glass frit. The present inventors have discovered that by incorporating an interpenetrating polymer network with a non-crosslinked polymer and a glass frit, the mechanical properties of the as-coated glass can be improved in comparison to a coating containing the non-crosslinked polymer and glass frit alone without an interpenetrating polymer network.

In particular, the present inventors have discovered that the adhesive strength evaluated by stud pull can be improved. For instance, the stud pull may be 275 psi or more, such as about 300 psi or more, such as about 400 psi or more, such as about 500 psi or more, such as about 750 psi or more, such as about 1,000 psi or more. The stud pull may be 2,000 psi or less, such as about 1,750 psi or less, such as about 1,500 psi or less, such as about 1,250 psi or less, such as about 1,000 psi or less, such as about 900 psi or less, such as about 750 psi or less, such as about 600 psi or less.

In addition, the present inventors have also discovered that the chemical resistance as evaluated by MEK rub testing can also be improved. For instance, in accordance with ASTM D5402-15, the coated glass substrate may exhibit an MEK rub resistance of 100 or more, such as 200 or more, such as 300 or more, such as 400 or more, such as 500 or more.

In addition to the above, the coated glass substrate may also exhibit other beneficial properties. For instance, the coated glass substrate may have a cross-hatch adhesion, which provides an assessment of the adhesion of the coating to the substrate by applying and removing pressure-sensitive tape over cutes made in the coating as determined in accordance with ASTM D3359-09, of 3B or higher, such as 4B or higher, such as 5B. The coating may have a Hoffman hardness of greater than 5, such as about 7 or greater, such as about 10 or greater, such as about 11 or greater, such as about 12 or greater, such as about 15 or greater, such as about 20 or greater to about 40 or less, such as about 30 or less, such as about 25 or less, such as about such as about 18 or less, such as about 15 or less as determined using a Hoffman hardness tester in accordance with GE E50TF61.

After being exposed to a copper-accelerated acetic acid-salt spray ("CASS") in accordance with ASTM B368-09 (2014), the coating may exhibit minimal color change. The color change can be characterized by the ΔE or ΔC value, which are known in the art and described in more detail below. More particularly, the ΔE value of the coating may be about 5 or less, such as about 4 or less, such as about 3 or less, such as about 2 or less, such as about 1.5 or less, such as about 1 or less, such as about 0.5 or less to about 0.01 or more, such as about 0.1 or more, such as about 0.2 or more, such as about 0.5 or more. Further, the ΔC value of the coating may be about 2 or less, such as about 1.5 or less, such as about 1 or less, such as about 0.5 or less to about 0.01 or more, such as about 0.1 or more, such as about 0.2 or more, such as about 0.5 or more. In addition, the coating may exhibit minimal changes in adhesion strength and mechanical strength. For instance, the coating may exhibit a cross-hatch adhesion as determined in accordance with ASTM D3359-09 of 3B or higher, such as 4B or higher, such as 5B. In addition, the coating may have a Hoffman hardness of about 5 or greater, such as about 10 or greater, such as about 12 or greater, such as about 15 or greater, such as about 20 or greater to about 40 or less, such as about 30 or less, such as about 25 or less, such as about such as about 18 or less, such as about 15 or less as determined using a Hoffman hardness tester in accordance with GE E50TF61.

In addition to the CASS testing, the aforementioned properties may also be present after undergoing a condenser chamber test, wherein a glass article with a coating is placed in a chamber at 45° C. at 100% humidity for 21 days. Also, such properties may be present after exposing the coated glass substrate to a cutting oil for one day. Such properties may also be present after conducting a thermal dwell test where the coated glass is placed in an oven at 60° C. for 7 days. Even after tempering, such properties may be present after any or all of the following tests: (1) placing the article in a chamber at 85° C./85H chamber for 3 days, (2) a condenser chamber test as previously defined, (3) exposure to 10% ammonium for 3 days, and/or (4) a thermal stability test where the tempered glass is placed in an oven at 650° C. for 16 minutes.

Various embodiments of the present invention will now be described in more detail.

A. Substrate

The glass substrate typically has a thickness of from about 0.1 to about 15 millimeters, in some embodiments from about 0.5 to about 10 millimeters, and in some embodiments, from about 1 to about 8 millimeters. The glass substrate may be formed by any suitable process, such as by a float process, fusion, down-draw, roll-out, etc. Regardless, the substrate is formed from a glass composition having a glass transition temperature that is typically from about 500° C. to about 700° C. The composition, for instance, may contain silica ($SiO_2$), one or more alkaline earth metal oxides (e.g., magnesium oxide (MgO), calcium oxide (CaO), barium oxide (BaO), and strontium oxide (SrO)), and one or more alkali metal oxides (e.g., sodium oxide ($Na_2O$), lithium oxide ($Li_2O$), and potassium oxide ($K_2O$)).

$SiO_2$ typically constitutes from about 55 mol. % to about 85 mol. %, in some embodiments from about 60 mol. % to about 80 mol. %, and in some embodiments, from about 65 mol. % to about 75 mol. % of the composition. Alkaline earth metal oxides may likewise constitute from about 5 mol. % to about 25 mol. %, in some embodiments from about 10 mol. % to about 20 mol. %, and in some embodiments, from about 12 mol. % to about 18 mol. % of the composition. In particular embodiments, MgO may constitute from about 0.5 mol. % to about 10 mol. %, in some embodiments from about 1 mol. % to about 8 mol. %, and in some embodiments, from about 3 mol. % to about 6 mol. % of the composition, while CaO may constitute from about 1 mol. % to about 18 mol. %, in some embodiments from about 2 mol. % to about 15 mol. %, and in some embodiments, from about 6 mol. % to about 14 mol. % of the composition. Alkali metal oxides may constitute from about 5 mol. % to about 25 mol. %, in some embodiments from about 10 mol. % to about 20 mol. %, and in some embodiments, from about 12 mol. % to about 18 mol. % of the composition. In particular embodiments, $Na_2O$ may constitute from about 1 mol. % to about 20 mol. %, in some embodiments from about 5 mol. % to about 18 mol. %, and in some embodiments, from about 8 mol. % to about 15 mol. % of the composition.

Of course, other components may also be incorporated into the glass composition as is known to those skilled in the art. For instance, in certain embodiments, the composition may contain aluminum oxide ($Al_2O_3$). Typically, $Al_2O_3$ is employed in an amount such that the sum of the weight percentage of SiO2 and Al2O3 does not exceed 85 mol. %. For example, $Al_2O_3$ may be employed in an amount from about 0.01 mol. % to about 3 mol. %, in some embodiments from about 0.02 mol. % to about 2.5 mol. %, and in some embodiments, from about 0.05 mol. % to about 2 mol. % of the composition. In other embodiments, the composition may also contain iron oxide ($Fe_2O_3$), such as in an amount from about 0.001 mol. % to about 8 mol. %, in some embodiments from about 0.005 mol. % to about 7 mol. %, and in some embodiments, from about 0.01 mol. % to about 6 mol. % of the composition. Still other suitable components that may be included in the composition may include, for instance, titanium dioxide ($TiO_2$), chromium (III) oxide ($Cr_2O_3$), zirconium dioxide ($ZrO_2$), yttria ($Y_2O_3$), cesium dioxide ($CeO_2$), manganese dioxide ($MnO_2$), cobalt (II, III) oxide ($CO_3O_4$), metals (e.g., Ni, Cr, V, Se, Au, Ag, Cd, etc.), and so forth.

B. Coating

As indicated above, a coating is provided on one or more surfaces of the substrate. For example, the glass substrate may contain first and second opposing surfaces, and the coating may thus be provided on the first surface of the substrate, the second surface of the substrate, or both. In one embodiment, for instance, the coating is provided on only the first surface. In such embodiments, the opposing second surface may be free of a coating or it may contain a different type of coating. Of course, in other embodiments, the coating of the present invention may be present on both the first and second surfaces of the glass substrate. In such embodiments, the nature of the coating on each surface may be the same or different.

Additionally, the coating may be employed such that it substantially covers (e.g., 95% or more, such as 99% or more) the surface area of a surface of the glass substrate. However, it should be understood that the coating may also be applied to cover less than 95% of the surface area of a surface of the glass substrate. For instance, the coating may be applied on the glass substrate in a decorative manner.

The coating may contain any number of different materials. For example, the coating may contain a binder and at least one metal oxide containing zinc oxide. As provided below, the binder may be one produced via sol gel method or may include an interpenetrating polymer network. As also provided below, the zinc oxide may be obtained from different sources, such as via a reaction using another zinc compound (e.g., zinc acetate) or a glass frit.

i. Binder

The coating disclosed herein can be produced using any binder generally known in the art. For instance, the binder may include an interpenetrating polymer network of at least two crosslinked polymers. In general, the interpenetrating network may include any number of resins. For instance, the network may include at least two polymer resins, such as at least three polymer resins, each having a chemical composition different from the other.

The interpenetrating network can be a fully-interpenetrating network or a semi-interpenetrating network. In one embodiment, the interpenetrating network is a fully-interpenetrating network such that the all of the resins of the network are crosslinked. That is, all of the resins of the binder are crosslinked to form the interpenetrating network. In this regard, the polymer chains of at least one respective resin are interlocked with the polymer chains of another respective resin such that they may not be separated without breaking any chemical bonds.

The interpenetrating network can also be a semi-interpenetrating network. In such instance, the network contains at one resin whose polymer chains are not interlocked with the polymer chains of a crosslinked resin such that the former polymers chains can theoretically be separated without breaking any chemical bonds.

In addition, the interpenetrating network may include a combination of an organic crosslinked network and an inorganic crosslinked network. For instance, at least one of the crosslinked resins may form an organic crosslinked network while at least one of the crosslinked resins may form an inorganic crosslinked resin. By organic crosslinked resin, it is meant that the polymerizable compound is a carbon-based compound. Meanwhile, by inorganic crosslinked resin, it is meant that the polymerizable compound is not a carbon-based compound. For instance, the polymerizable compound may be a silicon-based compound. In one embodiment, the interpenetrating network may include at least two organic crosslinked networks and one inorganic crosslinked network.

As described herein, an interpenetrating network can be synthesized using any method known in the art. For instance, a formulation containing all of the polymerizable compounds as well as any other reactants, reagents, and/or additives (e.g., initiators, catalysts, etc.) can be applied to a substrate and cured such that the simultaneous polymerization and crosslinking of the respective resins forms the interpenetrating network. In this regard, the respective crosslinked resins may form at substantially the same time. It should be understood that the aforementioned polymerizable compounds may include individual monomers and oligomers or pre-polymers.

An interpenetrating network can also exhibit certain properties that distinguish it from a simple blend of resins. The interpenetrating network may exhibit a glass transition temperature that is between or intermediate the glass transition temperature of any two of the first crosslinked resin, the second crosslinked resin, and the third resin. For instance, the interpenetrating network may have a glass transition temperature of from 0° C. to 300° C., such as from 10° C. to 250° C., such as from 20° C. to 200° C., such as from 30° C. to 180° C. The glass transition temperature may be measured by differential scanning calorimetry according to ASTM E1356. In addition, for other properties that may exhibit a bimodal distribution or a trimodal distribution due to the presence of a simple mixture of two resins or three resins, respectively, such properties of the interpenetrating network may exhibit a unimodal distribution.

In general, the resins of the binder may be a thermoplastic resin or a thermoset resin. At least one of the resins in the binder is a thermoset resin such that it can be cured/crosslinked. For instance, by curing, the thermoset resin can become hardened and allow for the formation of a coating. The thermoset resin is generally formed from at least one crosslinkable or polymerizable resin, such as a (meth)acrylic resin, (meth)acrylamide resin, alkyd resin, phenolic resin, amino resin, silicone resin, epoxy resin, polyol resin, etc. As used herein, the term "(meth)acrylic" generally encompasses both acrylic and methacrylic resins, as well as salts and esters thereof, e.g., acrylate and methacrylate resins. In one embodiment, at least two of the resins may be thermoset resins. In one embodiment, two of the resins may be thermoset resins while a third resin may be a thermoplastic resin. In another embodiment, at least three of the resins may be thermoset resins upon being crosslinked.

In this regard, the interpenetrating network may contain a crosslinked polyol resin. The crosslinked polyol resin can be obtained by reacting or crosslinking polyols. In general, polyols contain two or more hydroxyl groups (i.e., defined as an —OH group wherein the —OH group of a carboxyl group is not considered a hydroxyl group). In general, polyols can be non-polymeric polyols or polymeric polyols. Examples of such polyols may include, for instance, a diol compound, a polyether polyol, a polyester polyol, a polycarbonate polyol, a polyacrylate polyol, a polyurethane polyol, a polysiloxane polyol, a phenolic polyol, a sugar alcohol, a dendritic polyol, and so forth. In one embodiment, the polyol may be a diol compound, a polyether polyol, a sugar alcohol, and/or a dendritic polyol. However, it should be understood that the polyol may not be limited to the aforementioned and may include any polyol known in the art that can be polymerized and/or crosslinked.

As indicated above, the polyol may include a diol compound. For instance, the polyol may be an ethylene glycol, diethylene glycol, propylene glycol, dipropylene glycol, butanediol, pentanediol, hexanediol, heptanediol, octanediol, nonanediol, decanediol, etc. While the aforementioned are diol compounds containing two hydroxyl groups, it should be understood that compounds containing additional hydroxyl groups may also be employed.

In one embodiment, the polyol may include a polyurethane polyol. The polyurethane polyol may be formed by reacting one or more isocyanate groups with a polyol.

In one embodiment, the polyol may include a polyether polyol. The polyether polyol may include an ethoxylation or a propoxylation product of water or a diol. The polyether polyol may be polyethylene glycol, polypropylene glycol, or a combination thereof. In one embodiment, the polyether polyol may be polyethylene glycol. In another embodiment, the polyether polyol may be polypropylene glycol. For instance, the propylene glycol may be a monopropylene glycol, dipropylene glycol and/or a tripropylene glycol.

Additionally, the polyol may include a polyester polyol. The polyester polyol may be made by a polycondensation reaction of an acid or corresponding anhydride with a polyhydric alcohol. Suitable acids for example include, but are not limited to, benzoic acid, maleic acid, adipic acid, phthalic acid, isophthalic acid, terephthalic acid and sebacic acid as well as their corresponding anhydrides, and dimeric fatty acids and trimeric fatty acids and short oils. Suitable polyhydric alcohols include, but are not limited to, ethylene glycol, propylene glycol, diethylene glycol, 1,4-butanediol, 1,6-hexane diol, 2,2-dimethyl-1,3-propanediol, neopentyl glycol, tetraethylene glycol, polycarbonate diols, trimethylolethane, trimethylolpropane, glycerol, 1,4-cyclohexanediol, 1,4-cyclohexanedimethanol, and glycerol.

In another embodiment, the polyol may include a polyacrylate polyol. The polyacrylate polyol may be made by a copolymerization reaction of a hydroxyalkyl(meth)acrylate monomer, such as, for example, a hydroxy C1-C8 alkyl (meth)acrylate, with an acrylate monomer, such as, for example, a C1-C10 alkyl acrylate and a cyclo C6-C12 alkyl acrylate, or with a methacrylate monomer, such as, for example, a C1-C10 alkyl methacrylate and a cyclo C6-C12 alkyl methacrylate, or with a vinyl monomer, such as, for example, styrene, α-methylstyrene, vinyl acetate, vinyl versatate, or with a mixture of two or more of such monomers. Suitable hydroxyalkyl(meth)acrylate monomers include for example, hydroxyethyl acrylate, hydroxypropyl acrylate, hydroxyethyl methacrylate, hydroxypropyl methacrylate. Suitable alkyl (meth)acrylate monomers include, for example, methyl methacrylate, ethyl methacrylate, butyl methacrylate, butyl acrylate, ethylhexyl methacrylate, isobornyl methacrylate. Suitable polyacrylate polyols include, for example, hydroxy(C2-C8)alkyl (meth)acrylate-co-(C2-C8)alkyl (meth)acrylate copolymers.

The polyol may also include a sugar alcohol. For instance, the sugar alcohol may be a sucrose based alcohol. For instance, the polyol may be a sorbitol or a sorbitol based polyol. The sorbitol may be an ethoxylated and/or propoxylated sorbitol.

In a further embodiment, the polyol may be a dendritic polyol. Like other polyols, the dendritic polyols contain reactive hydroxyl groups with can react with other functional groups. Generally, such dendritic polyols can offer a large number of primary hydroxyl groups along a densely branched polymer backbone. The dendritic polyol may be a carbon based dendritic polyol or a silicon based dendritic polyol or a combination thereof. That is, the base polyol utilized for the formation of the dendritic polyol may include carbon, silicon, or a combination thereof. In one embodiment, the base polyol includes carbon. In another embodiment, the base polyol includes a combination of a silicon and carbon (i.e., a carbosilane). However, it should be understood that the base polyol may also include other atoms, such as another oxygen atom outside of the hydroxyl group.

In addition, to form the dendritic polyol, the base polyol should be a branched structure. For instance, from a central atom, there should be at least three, such as at least four substituent groups or branches that extend therefrom and allow the formation of a dendritic structure. In addition, the dendritic polyol may have an average degree of branching of more than zero and less than or equal to 1, such as from 0.2 to 0.8. Generally, according to definition, strictly linear polyols have a degree of branching of zero and ideally dendritic polyols have a degree of branching of 1.0. The average degree of branching may be determined by $^{13}$C-NMR spectroscopy.

In addition, the dendritic polyol may be a polyether polyol and/or a polyester polyol. In one embodiment, the dendritic polyol may be a polyether polyol. In another embodiment, the dendritic polyol may be a polyester polyol. In another embodiment, the dendritic polyol may be a combination of a polyether poly and a polyester polyol.

The dendritic polyol has at least 2, such as at least 3, such as at least 4, such as at least 5, such as at least 6, such as at least 8, such as at least 10, such as at least 15, such as at least 20, such as at least 30, such as at least 50, such as at least 100 terminal hydroxyl groups to 1000 or less, such as 500 or less, such as 100 or less, such as 75 or less, such as 50 or less, such as 25 or less, such as 15 or less, such as 10 or less terminal hydroxyl groups. The dendritic polyol has a molecular weight of at least 500 g/mol, such as at least 1,000 g/mol, such as at least 1,500 g/mol, such as at least 2,000 g/mol, such as at least 2,500 g/mol, such as at least 3,000 g/mol, such as at least 4,000 g/mol, such as at least 5,000 g/mol, such as at least 6,000 g/mol, such as at least 10,000 g/mol to 100,000 g/mol or less, such as 75,000 g/mol or less, such as 50,000 g/mol or less, such as 25,000 g/mol or less, such as 15,000 g/mol or less, such as 10,000 g/mol or less, such as 7,500 g/mol or less, such as 6,000 g/mol or less, such as 5,000 g/mol or less. While not necessarily limited, the dendritic polyol may be any of those available under the name Boltorn™.

When such dendritic polyols are employed, crosslinked networks can be obtained. For instance, crosslinked networks can be obtained via a condensation reaction with any silanes, in particular hydrolyzed silanes present in the formulation. In addition, reactions may occur with a melamine resin. In this regard, the dendritic polyol may serve as a crosslinking agent. In particular, a carbocation intermediate may be formed in the melamine resin. Thereafter, condensation may occur between the melamine resin and the dendritic polyol. Such reactions may occur via SN1 mechanisms. In addition to such reactions, the dendritic polyol may also react with the glass substrate. That is, the dendritic polyol may react with hydroxyl groups present on the glass substrate. Such reaction may improve the adhesive strength of the coating on the glass substrate thereby resulting in improved stud pull and cross-hatch properties.

Any of a variety of curing mechanisms may generally be employed to form the crosslinked polyol resin. In certain embodiments, for instance, a crosslinking agent may be employed to help facilitate the formation of crosslink bonds. For example, an isocyanate crosslinking agent may be employed that can react with amine or hydroxyl groups on the polyol polymerizable compound. The isocyanate crosslinking agent can be a polyisocyanate crosslinking agent. In addition, the isocyante crosslinking agent can be aliphatic (e.g., hexamethylene diisocyanate, isophorone diisocyanate, etc.) and/or aromatic (e.g., 2,4 tolylene diisocyanate, 2,6-tolylene diisocyanate, etc.). The reaction can provide urea bonds when reacting with an amine group and urethane bonds when reacting with a hydroxyl group. In this regard, the crosslinked polymer or resin may be a polyurethane.

In yet another embodiment, a melamine crosslinking agent may be employed that can react with hydroxyl groups on the polyol polymerizable compound to form the crosslink bonds. Suitable melamine crosslinking agents may include, for instance, resins obtained by addition-condensation of an amine compound (e.g., melamine, guanamine, or urea) with formaldehyde. Particularly suitable crosslinking agents are fully or partially methylolated melamine resins, such as hexamethylol melamine, pentamethylol melamine, tetramethylol melamine, etc., as well as mixtures thereof. Such reactions can provide ether bonds when reacting a hydroxyl group of the polyol polymerizable compound with a hydroxyl group of the amine (e.g., melamine) crosslinking agent. In this regard, the crosslinked polymer or resin may be a polyurethane.

In one embodiment, the first crosslinked resin is a crosslinked polyol resin with urethane bonds formed by the polyol and the crosslinking agent. In this regard, the polyol is crosslinked with an isocyanate crosslinking agent. In another embodiment, the first crosslinked resin is a crosslinked polyol resin with ether bonds formed by the polyol and the crosslinking agent. In this regard, the polyol is crosslinked with an amine crosslinking agent containing hydroxyl groups, such as a melamine-formaldehyde crosslinking agent.

In general, reactions may occur via an SN1 mechanism in the presence of an acid catalyst (e.g., p-toluene sulfonic acid). For instance, when a melamine formaldehyde crosslinking agent is employed, a proton can be attacked by an oxygen atom (in —CH$_2$OCH$_3$) located in the melamine formaldehyde to generate a carbocation intermediate with —CH$_3$OH remaining as the by-product. Then, the nucleophilic oxygen in the polyol can attack the electrophilic carbocation intermediate to create a chemical bond between the melamine-formaldehyde and the polyol.

In one embodiment, the binder may also contain an acrylate resin. The acrylate resin may be one derived from acrylic acid, methacrylic acid, or a combination thereof. For instance, the acrylate monomer includes, but is not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one embodiment, the acrylate monomers may be diacrylate monomers. For instance, the acrylate monomers may be diacrylate monomers including, but not limited to, methyl diacrylate, ethyl diacrylate, n-propyl diacrylate, i-propyl diacrylate, n-butyl diacrylate, s-butyl diacrylate, i-butyl diacrylate, t-butyl diacrylate, n-amyl diacrylate, i-amyl diacrylate, isobornyl diacrylate, n-hexyl diacrylate, 2-ethylbutyl diacrylate, 2-ethylhexyl diacrylate, n-octyl diacrylate, n-decyl diacrylate, methylcyclohexyl diacrylate, cyclopentyl diacrylate, cyclohexyl diacrylate, methyl dimethacrylate, ethyl dimethacrylate, 2-hydroxyethyl dimethacrylate, n-propyl dimethacrylate, n-butyl dimethacrylate, i-propyl dimethacrylate, i-butyl dimethacrylate, n-amyl dimethacrylate, n-hexyl dimethacrylate, i-amyl dimethacrylate, s-butyl-dimethacrylate, t-butyl dimethacrylate, 2-ethylbutyl dimethacrylate, methylcyclohexyl dimethacrylate, cinnamyl dimethacrylate, crotyl dimethacrylate, cyclohexyl dimethacrylate, cyclopentyl dimethacrylate, 2-ethoxyethyl dimethacrylate, isobornyl dimethacrylate, etc., as well as combinations thereof.

In general, the acrylate monomers may be aliphatic monomers. For instance, the monomers may be used to form aliphatic oligomers. In this regard, in one embodiment, the aliphatic monomers or oligomers may not contain any aromatic components.

The monomers may also include any derivatives of the aforementioned. In general, these monomers can be referred to as the polymerizable compounds of the acrylate resins. In a further embodiment, the monomers may be polymerized, including by graft, block, or random polymerization, with a non-acrylate monomer to form an acrylate co-polymer. As used herein, a (meth)acrylate copolymer can mean either a methacrylate copolymer or an acrylate copolymer, either in their modified or unmodified form. For example, such a copolymer may comprise any of the acrylate monomers contained herein copolymerized with polyesters, polyvinyl acetates, polyurethanes, polystyrene, or combinations thereof. In one example, the co-polymer may include a polystyrene copolymer and more particularly, a meth-methylacrylate and polystyrene copolymer.

In one embodiment, the acrylate resin is made from monomers including the monoacrylates and the diacrylates. In another embodiment, the monomers consist of the diacrylate monomers.

The acrylate resins may also further include a glycidyl functional group. For instance, the acrylate monomer may be a glycidyl group containing acrylate monomer such that the glycidyl group is not part of the backbone but instead imparts functionality to the acrylate monomer.

In general, these acrylate resins can be synthesized according to any method known in the art. The acrylate resins can be formed in one reaction step or in more than one reaction step. If multiple steps are employed, a prepolymer may be formed initially which can then undergo further reactions to synthesize the acrylate resins disclosed herein. Also, the acrylate resins can be synthesized using UV radiation.

In addition, the glycidyl or epoxy groups of the resins may be crosslinked. Crosslinking may be performed using any method and using any crosslinking agent generally employed in the art. The crosslinking agent may be an amine, an amide, an acrylate, or a combination thereof. In one embodiment, the crosslinking agent may be an amine. In one embodiment, the crosslinking agent may be a diamine, a triamine, or a combination thereof. In another embodiment, the crosslinking agent may be an amide. In a further embodiment, the crosslinking agent may be an acrylate. For instance, the acrylate may be an ethoxylated acrylate, such as an ethoxylated trimethylolpropane triacrylate. Without intending to be limited by theory, it is believed that crosslinking can be employed to improve the integrity of the coating.

In general, an initiator (e.g., benzoyl peroxide) can be used to form a free radical which can attack a double bond on a crosslinking agent, monomer or oligomer to form free radicals which can then subsequently attack other monomers or oligomers and form a three dimensional crosslinked network.

In one embodiment, the binder may also contain an epoxy resin. In general, such an epoxy resin can be formed using any method generally known in the art. The epoxy resins can be synthesized from any compounds that contain an epoxy component. Such compounds may include at least one epoxide functional group, such as at least two epoxide functional groups. In general, an epoxy compound is a compound that includes epoxide groups and may be reacted or cross-linked. These compounds containing the epoxide functional groups can be referred to as the polymerizable compounds of the epoxy resins.

Suitable epoxy resins include, but are not limited to, epoxy resins based on bisphenols and polyphenols, such as, bisphenol A, tetramethylbisphenol A, bisphenol F, bisphenol S, tetrakisphenylolethane, resorcinol, 4,4'-biphenyl, dihydroxynaphthylene, and epoxy resins derived from novolacs, such as, phenol:formaldehyde novolac, cresol:formaldehyde novolac, bisphenol A novolac, biphenyl-, toluene-, xylene, or mesitylene-modified phenol:formaldehyde novolac, aminotriazine novolac resins and heterocyclic epoxy resins derived from p-amino phenol and cyanuric acid. Additionally, aliphatic epoxy resins derived from 1,4-butanediol, glycerol, and dicyclopentadiene skeletons, are suitable. Examples of heterocyclic epoxy compounds are diglycidylhydantoin or triglycidyl isocyanurate.

In certain embodiments, the epoxy resins may include a diglycidyl ether. For instance, the epoxy resins may be non-aromatic hydrogenated cyclohexane dimethanol and diglycidyl ethers of hydrogenated Bisphenol A-type epoxide resin (e.g., hydrogenated bisphenol A-epichlorohydrin epoxy resin), cyclohexane dimethanol. Other suitable non-aromatic epoxy resin may include cycloaliphatic epoxy resins.

Additionally, the epoxy compound may be a combination of an epoxy compound and an acrylate compound. For instance, such compound may be an epoxy acrylate oligomer, such as an epoxy diacrylate, an epoxy tetraacrylate, or a combination thereof. For example, such compound may be a bisphenol A epoxy diacrylate, bisphenol A epoxy tetraacrylate, or a combination thereof. Such acrylate may be any of those referenced herein. For instance, the compound may be a bisphenol A epoxy dimethacrylate or a bisphenol A epoxy tetramethacrylate. Such oligomers may also be modified to include a substituent group. For instance, such substituent group may include an amine, a carboxyl group (e.g., a fatty acid), etc.

In addition, the epoxy groups of the resins may be crosslinked using any method and using any crosslinking agent generally employed in the art. The crosslinking agent may be an amine, an amide, an acid, a phenol, an alcohol, etc. In one embodiment, the crosslinking agent may be an amine. In one embodiment, the crosslinking agent may be a diamine, a triamine, or a combination thereof. In another embodiment, the crosslinking agent may be an amide. In one embodiment, the crosslinking agent may be an acrylate, such as a diacrylate or a triacrylate. In general, an initiator (e.g., benzoyl peroxide) can be used to form a free radical which can attack a double bond on a crosslinking agent or oligomer to form monomeric free radicals which can then subsequently attack other oligomers and form a three dimensional crosslinked network.

The binder may also contain a silicon-containing resin. For instance, the silicon-containing resin may be a polysiloxane resin. In particular, the polysiloxane resin may be a polysilsesquioxane resin. In general, such a silicon-containing resin can be formed using any method generally known in the art. For instance, the silicon-containing resin can be formed by reacting organosilicon compounds, such as organosilane compounds. That is, the organosilicon compounds, such as the organosilane compounds, can be referred to as the polymerizable compounds of the silicon-containing resin.

These organosilicon compounds may include organosilane compounds, such as alkylsilanes including substituted alkyl silanes. The organosilicon compounds may also include organoalkoxysilanes, organofluorosilanes, etc. In this regard, the organosilicon compounds may include a combination of alkylsilane compounds and organoalkoxysilane compounds.

Examples of organoalkoxysilane compounds include those as the aforementioned organoalkoxysilane compound employed in the binder using the sol-gel process. In one embodiment, the silicon-containing resin is made from organosilicon compounds consisting of the organoalkoxysilane compounds as mentioned above.

In one embodiment, the binder may be formed via sol-gel. For instance, the binder may be formed from a metal and/or non-metal alkoxide compound. In particular, such alkoxides may be employed to form a polymerized (or condensed) alkoxide coating. For instance, the compounds may undergo a hydrolysis reaction and a condensation reaction. Then, the solvent is removed by heating or other means to provide the coating.

Generally, an alkoxide may have the following general formula $$M^{x+}(OR)^-_x$$

wherein,
x is from 1 to 4;
R is an alkyl or cycloalkyl; and
M is a metal or a non-metal cation.

While R, M, and x may be generally selected accordingly, in certain embodiments, they may be selected according to the following.

As indicated above, "x" may be from 1 to 4. However, "x" may be selected based upon the valence of the chosen metal or non-metal cation. As indicated above, "x" may be 1, 2, 3, or 4. In one embodiment, "x" is 1 while in other embodiments, "x" may be 2. In another embodiment, "x" may be 3 while in another embodiment "x" may be 4.

Similarly, "R" may be selected based upon the desired characteristics, including the desired stereospecificity of the resulting alkoxide. For instance, "R" may be an alkyl or cycloalkyl. In this regard, such alkyl may be $C_1$ or greater, such as a $C_1$-$C_6$, such as a $C_1$-$C_3$, such as a $C_2$-$C_3$. Meanwhile, such cycloalkyl may be $C_3$ or greater, such as a $C_3$-$C_6$, such as a $C_4$-$C_6$, such as a $C_4$-$C_5$. When "R" is an alkyl, "R" may be selected to be a methyl, ethyl, butyl, propyl, or isopropyl group. In one embodiment, "R" may be a propyl group, such as an isopropyl group. When R is a cycloalkyl, "R" may be a cyclopropyl, cyclobutyl, cyclopentyl, or cyclohexyl group.

As indicated above, "M" may be a metal cation or a non-metal cation. In one embodiment, "M" may be a metal cation. The metal may be a Group IA, IIA, IIIA, IVA, VA, VIA, IB, IIB IIIB, IVB, VB, VIB, VIIB, or VIIIB metal. For instance, "M", while not necessarily limited to the following, may be aluminum, cobalt, copper, gallium, germanium, hafnium, iron, lanthanum, molybdenum, nickel, niobium, rhenium, scandium, silicon, sodium, tantalum, tin, titanium, tungsten, or zirconium. In one particular embodiment, "M" may be copper, aluminum, zinc, zirconium, silicon or titanium. In one embodiment, "M" may include any combination of the aforementioned. For instance, the alkoxide may include a combination of alkoxides including copper, aluminum, zinc, zirconium, silicon and titanium. In one embodiment, "M" may include at least silicon. In another embodiment, "M" may be a non-metal cation, such as a metalloid as generally known in the art.

In yet further embodiments, alkoxides may be selected according to the following exemplary embodiments. For example, exemplary alkoxides may include Cu(OR), Cu(OR)$_2$, Al(OR)$_3$, Zr(OR)$_4$, Si(OR)$_4$, Ti(OR)$_4$, and Zn(OR)$_2$, wherein R is a $C_1$ or greater alkyl group. For instance, the metal alkoxide may include, but is not limited to, aluminum butoxide, titanium isopropoxide, titanium propoxide, titanium butoxide, zirconium isopropoxide, zirconium propoxide, zirconium butoxide, zirconium ethoxide, tantalum ethoxide, tantalum butoxide, niobium ethoxide, niobium butoxide, tin t-butoxide, tungsten (VI) ethoxide, germanium, germanium isopropoxide, hexyltrimethoxylsilane, tetraethoxysilane, and so forth, and in a more particular embodiment may be titanium isopropoxide, zirconium n-propoxide, aluminum s-butoxide, copper propoxide, and/or tetraethoxysilane.

In particular, the alkoxide compound may be an organoalkoxysilane compound. Examples of organoalkoxysilane compounds include those having the following general formula:

$$R^5_a Si(OR^6)_{4-a}$$

wherein,
a is from 0 to 3, and in some embodiments, from 0 to 1;
$R^5$ is an alkyl, alkenyl, aryl, heteroaryl, cycloalkyl, heterocyclyl, halo, or haloalkyl; and
$R^6$ is an alkyl.

In certain embodiments, "a" is 0 such that that the organosilane compound is considered an organosilicate. One example of such a compound is tetraethyl orthosilicate (Si(OC$_2$H$_5$)$_4$). In other embodiments, "a" is 1 such that the organosilane compound is considered a trialkoxysilane compound. In one embodiment, for instance, R5 in the trialkoxysilane compound may be an alkyl, aryl, or haloalkyl (e.g., fluoroalkyl). Such group may have at least 1 carbon atom, such as at least 2 carbon atoms, such as at least 3 carbon atoms and may have 25 carbon atoms or less, such as 20 carbon atoms or less, such as 10 carbon atoms or less, such as 5 carbon atoms or less. Several examples of such trialkoxysilane compounds include, for instance, ethyltrimethoxysilane (CH$_3$CH$_2$Si(OCH$_3$)$_3$), ethyltriethoxysilane (CH$_3$CH$_2$Si(OCH$_2$CH$_3$)$_3$), phenyltrimethoxysilane (phenyl-(OCH$_3$)$_3$), phenyltriethoxysilane (phenyl-(OCH$_2$CH$_3$)$_3$), hexyltrimethoxylsilane (CH$_3$ (CH$_2$)$_5$Si(OCH$_3$)$_3$), hexyltriethoxylsilane (CH$_3$ (CH$_2$)$_5$Si(OCH$_2$CH$_3$)$_3$), heptadecapfluoro-1,2,2-tetrahydrodecyltrimethoxysilane (CF$_3$ (CF$_2$)$_7$ (CH$_2$)$_2$Si(OCH$_3$)$_3$), 3-glycidoxypropyltrimethoxysilane (CH$_2$ (O)CH—CH$_2$O—(CH$_2$)$_3$—Si(OCH$_3$)$_3$), etc., as well as combinations thereof.

Any of a variety of curing mechanisms may generally be employed to form the silicon-containing resin. For instance, the alkoxysilanes can undergo a hydrolysis reaction to convert the OR6 groups into hydroxyl groups. Thereafter, the hydroxyl groups can undergo a condensation reaction to form a siloxane functional group. In general, reactions may occur via an SN2 mechanism in the presence of an acid. For instance, silanes may be hydrolyzed and then condensed to form the crosslinked network. In addition, the hydrolyzed silanes may also react with silica particles, such as silica nanoparticles, when employed.

To initiate the reaction, the organosilane compound may initially be dissolved in a solvent to form a solution. Particularly suitable are organic solvents, such as hydrocarbons (e.g., benzene, toluene, and xylene); ethers (e.g., tetrahydrofuran, 1,4-dioxane, and diethyl ether); ketones (e.g., methyl ethyl ketone); halogen-based solvents (e.g., chloroform, methylene chloride, and 1,2-dichloroethane); alcohols (e.g., methanol, ethanol, isopropyl alcohol, and isobutyl alcohol); and so forth, as well as combinations of any of the foregoing. Alcohols are particularly suitable for use in the present invention. The concentration of the organic solvent within the solution may vary, but is typically employed in an amount of from about 70 wt. % to about 99 wt. %, in some embodiments from about 80 wt. % to about 98 wt. %, and in some embodiments, from about 85 wt. % to about 97 wt. % of the solution. Organosilane compounds may likewise constitute from about 1 wt. % to about 30 wt. %, in some embodiments from about 2 wt. % to about 20 wt. %, and in some embodiments, from about 3 wt. % to about 15 wt. % of the solution.

In general, the crosslinked resins form crosslinks with itself. That is, for example, the first crosslinked resin is formed by reacting a polyol with a crosslinking agent. The second crosslinked resin is formed by reacting silicone-containing compounds. However, in one embodiment, one resin may form covalent bonds with another resin. For instance, the first crosslinked polyol resin may also have some covalent bonds with another resin, such as the silicon-containing resin. In addition, silica particles, such as silica nanoparticles, when employed, can also be used to react with the polyol resin to introduce nanoparticles into the crosslinked polyol resin.

ii. Glass Frit

The coating also contains at least one glass frit. The glass frit may help adhere the coating to the substrate. The glass frit typically contains $SiO_2$ in an amount from about 25 mol. % to about 55 mol. %, in some embodiments from about 30 mol. % to about 50 mol. %, and in some embodiments, from about 35 mol. % to about 45 mol. %. Other oxides may also be employed. For example, alkali metal oxides (e.g., $Na_2O$ or $K_2O$) may constitute from about 5 mol. % to about 35 mol. %, in some embodiments from about 10 mol. % to about 30 mol. %, and in some embodiments, from about 15 mol. % to about 25 mol. % of the frit. $Al_2O_3$ may also be employed in an amount from about 1 mol. % to about 15 mol. %, in some embodiments from about 2 mol. % to about 12 mol. %, and in some embodiments, from about 5 mol. % to about 10 mol. % of the frit.

In other embodiments, the composition may also contain a transition metal oxide (e.g., ZnO) as a melting point suppressant, such as in an amount from about 5 mol. % to about 40 mol. %, in some embodiments from about 10 mol. % to about 35 mol. %, and in some embodiments, from about 15 mol. % to about 30 mol. % of the frit. The glass frit may also include oxides that help impart the desired color. For example, titanium dioxide ($TiO_2$) may be employed to help provide a white color, such as in an amount of from about 0.1 mol. % to about 10 mol. %, in some embodiments from about 0.5 mol. % to about 8 mol. %, and in some embodiments, from about 1 mol. % to about 5 mol. % of the frit.

Likewise, bismuth oxide ($Bi_2O_3$) may be employed in certain embodiments to help provide a black color. When employed, $Bi_2O_3$ may constitute from about 10 mol. % to about 50 mol. %, in some embodiments from about 25 mol. % to about 45 mol. %, and in some embodiments, from about 30 mol. % to about 40 mol. % of the frit.

In addition to the above, the glass frit may include various other oxides, including chromic oxide, thorium dioxide, copper oxide, nickel oxide, manganese oxide, iron oxide, rubidium oxide, or any combination thereof (including any combination with any of the other aforementioned oxides).

Of course, in addition to or in lieu of controlling the oxide content of the frit to provide the desired color, pigments may also be employed in the paint layer as is known in the art. Examples of such pigments may include, for instance, metallic pigments (e.g., aluminum flake, copper bronze flake, and metal oxide coated mica), white pigments (e.g., titanium dioxide, zinc oxide, etc.), black pigments (e.g., carbon black, iron black, titanium black, etc.), green pigments (e.g., chromium oxide pigments, copper pigments), red/orange/yellow pigments (e.g., iron oxide pigments), and so forth.

The glass frit is typically present in the coating in an amount of about 40 wt. % or more, such as about 50 wt. % or more, such as about 60 wt. % or more, such as about 70 wt. % or more to about 99 wt. % or less, such as about 95 wt. % or less, such as about 90 wt. % or less, such as about 85 wt. % or less, such as about 80 wt. % or less, such as about 70 wt. % or less. Such concentration may be for a coating after curing and/or after tempering.

Regardless of the chosen composition of the glass frit, the glass frit may include particles having a narrow particle diameter distribution. For instance, the glass frit may have an average particle diameter between about 0.1 μm and about 50 μm. However, glass frit according to the present disclosure may have a particle diameter outside of the range, such as greater than about 1 μm, such as greater than about 5 μm, such as greater than about 10 μm, such as greater than about 15 μm, such as greater than about 20 μm, such as greater than about 25 μm, such as greater than about 30 μm, such as greater than about 35 μm, such as greater than about 40 μm, such as greater than about 45 μm, such as greater than about 50 μm, such as greater than about 55 μm, such as greater than about 60 μm, such as greater than about 70 μm, such as less than about 100 μm, such as less than about 95 μm, such as less than about 90 μm, such as less than about 85 μm, such as less than about 80 μm, such as less than about 75 μm, such as less than about 70 μm, such as less than about 65 μm.

The glass frit may have a D50 of 2 μm or more, such as 2.5 μm or more, such as 3 μm or more, such as 3.5 μm or more, such as 4 μm or more to 7 μm or less, such as 6.5 μm or less, such as 6 μm or less, such as 5.5 μm or less, such as 5 μm or less, such as 4.5 μm or less, such as 4 μm or less. The glass frit may have a D10 of 0.25 μm or more, such as 0.5 μm or more, such as 0.75 μm or more, such as 1 μm or more to 2.5 μm or less, such as 2 μm or less, such as 1.5 μm or less, such as 1.25 μm or less. The glass frit may have a D90 of 6 μm or more, such as 6.5 μm or more, such as 7 μm or more, such as 7.5 μm or more, such as 8 μm or more, such as 8.5 μm or more, such as 9 μm or more, such as 9.5 μm or more, such as 10 μm or more, such as 10.5 μm or more, such as 11 μm or more to 20 μm or less, such as 15 μm or less, such as 14 μm or less, such as 13 μm or less, such as 12.5 μm or less, such as 12 μm or less, such as 11.5 μm or less.

The glass frit may have a melting temperature of from about 400° C. to about 700° C., and in some embodiments, from about 500° C. to about 600° C.

In addition, the glass frit employed may have a glass transition temperature of 300° C. or more, such as 350° C. or more, such as 400° C. or more, such as 425° C. or more, such as 450° C. or more, such as 470° C. or more, such as 475° C. or more, such as 500° C. or more, such as 525° C. or more, such as 550° C. or more, such as 560° C. or more. The glass transition temperature may be 800° C. or less, such as 750° C. or less, such as 700° C. or less, such as 650° C. or less, such as 600° C. or less, such as 575° C. or less. In one embodiment, the glass frit may have two glass transition temperatures.

The glass frit may have a particular particle size. For instance, the glass frit may have an average particle size of 0.1 microns or more, such as 0.25 microns or more, such as 0.5 microns or more, such as 1 micron or more, such as 2 microns or more, such as 2.5 microns or more, such as 3 microns or more to 9 microns or less, such as 8 microns or less, such as 5 microns or less, such as 4 microns or less, such as 3.5 microns or less. The glass frit may also have a median particle size within the aforementioned particle size values. The glass frit may have a D10 of 0.05 microns or more, such as 0.1 microns or more, such as 0.2 microns or more, such as 0.3 microns or more, such as 0.35 microns or more to 1 micron or less, such as 0.75 microns or less, such as 0.5 microns or less, such as 0.4 microns or less. The glass frit may have a D90 of 5 microns or more, such as 7.5 microns or more, such as 8 microns or more, such as 8.5 microns or more, such as 9 microns or more to 25 microns or less, such as 20 microns or less, such as 15 microns or less, such as 13 microns or less, such as 11 microns or less, such as 10 microns or less, such as 9.5 microns or less.

In addition, the glass frit may be provided in the form of a liquid. Such liquid may include other components such as a binder. For example, in one embodiment, such binder may include a polymer, in particular a non-crosslinked polymer. In this regard, such polymer may be a thermoplastic polymer. The thermoplastic polymer may be linear, branched, or dendritic. In one particular embodiment, the thermoplastic polymer may be a linear polymer. In another particular embodiment, the thermoplastic polymer may be a branched polymer.

The non-crosslinked polymer may generally be any as known in the art, in particular capable of serving as a binder. For instance, such polymer may be a polyolefin (e.g., polyethylene, polypropylene), a polyester (e.g., polyethylene terephthalate, polylactic acid), a polyamide, a polystyrene (e.g., acrylonitrile butadiene styrene), a polyacrylate (or polyacrylic), a polyvinyl alcohol, a polycarbonate (e.g., polypropylene carbonate, polyethylene carbonate), a polyoxymethylene, a polyetheretherketone, a polyarylene sulfide (e.g., polyphenylene sulfide), a polysulfone (e.g., polyether sulfone), polyimide, polyphenylene oxide, a polytetrafluoroethylene, a cellulose (e.g., a nitrocellulose), etc. In particular, the non-crosslinked polymer may be an acrylate polymer or copolymer thereof (i.e., a polyacrylate), a styrene polymer or copolymer thereof (i.e., a polystyrene), or a mixture thereof.

As indicated above, in one embodiment, the non-crosslinked polymer may be an acrylate polymer or copolymer thereof. In one particular embodiment, the non-crosslinked resin may be an acrylate copolymer. The acrylate polymer may be one derived from acrylic acid, methacrylic acid, or a combination thereof. For instance, the acrylate monomer includes, but is not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In addition, when forming the copolymer, the comonomer is not necessarily limited. The comonomer may be any comonomer generally employed in the art and in particular any monomer used to form the aforementioned non-crosslinked thermoplastic polymers. In one particular embodiment, the comonomer may be an acrylonitrile, a styrene, a butadiene, an acrylamide, a vinyl acetate, an epoxide monomer, a maleimide, a carbohydrate monomer, a fluorinated acrylic, etc., or a combination thereof. In a further embodiment, the comonomer may be an acrylonitrile, a styrene, or a combination thereof. In one embodiment, the comonomers include both an acrylonitrile and a styrene.

As indicated above, the non-crosslinked polymer may be a styrene polymer or copolymer thereof. The styrene may be any type of styrene monomer generally employed in the art. For instance, the styrene monomer may include those with substituent groups present on the aromatic hydrocarbon. In addition, when forming the copolymer, the comonomer is not necessarily limited. The comonomer may be any comonomer generally employed in the art and in particular any monomer used to form the aforementioned non-crosslinked thermoplastic polymers. In particular, the comonomer may be an acrylate (as mentioned above), an acrylonitrile, a butadiene, etc., or a combination thereof. In one embodiment, the comonomer may be an acrylate (as mentioned above), an acrylonitrile, or a combination thereof. In a further embodiment, the comonomers may include both an acrylate (as mentioned above) and an acrylonitrile.

When present, such non-crosslinked polymer may be present in the coating formulation with the aforementioned polymerizable compounds of the interpenetrating network. In this regard, as such polymer is not crosslinked, it may allow for the polymerizable compounds to react around the polymer chains thereby forming a semi-interpenetrating polymer network. Without intending to be limited by theory, such polymer may provide a desirable viscosity used for the coating process. In addition, it could assist in reducing any bubbles and/or defects generated by the polymerizable compounds.

iii. Additional Additives

The coating may also include any number of additives as generally known in the art. In general, these additives may be added to the coating formulation containing the polymerizable compounds. In this regard, the additives may be present during polymerization and/or crosslinking of the polymerizable compounds and resin. In some instances, the additives may form covalent bonds with the polymerizable compounds and/or a resin.

As indicated herein, the coating may include at least one colorant. For instance, the colorant may include a pigment, a dye, or a combination thereof. For instance, the colorant may be an inorganic pigment (e.g., metallic pigments, white pigments, black pigments, green pigments, red/orange/yellow pigments, etc.), a fluorescent colorant, or a combination thereof. The colorant may be employed to provide a certain color the glass substrate and/or coating.

As indicated herein, the coating may include at least one light stabilizer. For instance, the light stabilizer may comprise a UV absorber (e.g., benzophenones, benzotriazoles, triazines, and combinations thereof), a hindered amine, or a combination thereof. In general, UV absorbers may be employed in the coating to absorb ultraviolet light energy. Meanwhile, hindered amine light stabilizers may be employed in the coating to inhibit degradation of the resins and coating thereby providing color stability and extending its durability. As a result, in some embodiments, a combination of a UV absorber and a hindered amine light stabilizer may be employed.

As indicated herein, the coating may contain at least one hindered amine light stabilizer ("HALS"). Suitable HALS compounds may be piperidine-based compounds. Regardless of the compound from which it is derived, the hindered amine may be an oligomeric or polymeric compound. The compound may have a number average molecular weight of about 1,000 or more, in some embodiments from about 1,000 to about 20,000, in some embodiments from about 1,500 to about 15,000, and in some embodiments, from about 2,000 to about 5,000. In addition to the high molecular weight hindered amines, low molecular weight hindered amines may also be employed. Such hindered amines are generally monomeric in nature and have a molecular weight of about 1,000 or less, in some embodiments from about 155 to about 800, and in some embodiments, from about 300 to about 800.

In addition, the light stabilizer may be a polymerizable light stabilizer. In this regard, the polymerizable light stabilizer can be directly attached to a resin, such as a resin in the binder. Such attachment can provide a benefit of minimizing or removing the mobility of the light stabilizer. Such light stabilizers can simply be reacted via a functional group with a functional group of a resin during curing. These polymerizable light stabilizers may contain a carbon-carbon double bond, a hydroxyl group, a carboxyl group, an active ester group, and/or an amine group that allows for the light stabilizer to be covalently attached with the resins. In essence, the light stabilizer would be a part of the backbone of the resin either in an intermediate part of the resin or a terminal part of the resin. Suitably, the light stabilizer is present in an intermediate part of the resin.

The coating formulation may contain a surfactant. The surfactant may be an anionic surfactant, a cationic surfactant, and/or a non-ionic surfactant. For instance, in one embodiment, the surfactant may be a non-ionic surfactant. The non-ionic surfactant may be an ethoxylated surfactant, a propoxylated surfactant, an ethoxylated/propoxylated surfactant, polyethylene oxide, an oleate (e.g., sorbitan monooleate, etc.), fatty acid ester or derivative thereof, an alkyl glucoside, a sorbitan alkanoate or a derivative thereof, a combination thereof, etc. When employed, surfactants typically constitute from about 0.001 wt. % to about 2 wt. %, in some embodiments from about 0.005 wt. % to about 1 wt. %, in some embodiments, from about 0.01 wt. % to about 0.5 wt. % of the formulation, and in some embodiments from about 0.1 wt. % to about 0.25 wt. %.

The coating formulation may also contain one or more organic solvents. Any solvent capable of dispersing or dissolving the components may be suitable, such as alcohols (e.g., ethanol or methanol); dimethylformamide, dimethyl sulfoxide, hydrocarbons (e.g., pentane, butane, heptane, hexane, toluene and xylene), ethers (e.g., diethyl ether and tetrahydrofuran), ketones and aldehydes (e.g., acetone and methyl ethyl ketone), acids (e.g., acetic acid and formic acid), and halogenated solvents (e.g., dichloromethane and carbon tetrachloride), and so forth. The coating formulation may also contain water. Although the actual concentration of solvents employed will generally depend on the components of the formulation and the substrate on which it is applied, they are nonetheless typically present in an amount from about 1 wt. % to about 40 wt. %, in some embodiments from about 5 wt. % to about 35 wt. %, and in some embodiments, from about 10 wt. % to about 30 wt. % of the formulation (prior to drying).

In addition, other additives may be employed to facilitate dispersion of the components and/or assist in formation of the coating. For instance, the coating formulation may contain an initiator and/or a catalyst, such as an acid catalyst. Examples of such acid catalysts may include, for instance, acetic acid, sulfonic acid, nitric acid, hydrochloric acid, malonic acid, glutaric acid, phosphoric acid, etc., as well as combinations thereof. Also, the initiator may be a photoinitiator that allows for the polymerization of a polymerizable compound, such as an acrylate.

C. Process

A variety of different techniques may generally be employed to form the coating. As just one example, a coating formulation comprising a glass frit is applied to a surface of the glass substrate. The coating formulation also contains the binder which includes polymerizable compounds (e.g., monomers, oligomers and/or pre-polymers). When present, the coating formulation may also include the aforementioned non-crosslinked polymer.

Once applied to the substrate, the coating formulation can be heated to form the coating layer and then cured to form the coating layer. During or before the heating step, techniques may be employed to polymerize the polymerizable compounds. Such techniques may include exposure to UV radiation. In this regard, the combination of UV radiation and heating can allow for the formation of an interpenetrating network. Alternatively, if employing the aforementioned alkoxides, the heating may allow for hydrolysis and condensation of the polymer network containing the silicon alkoxides (e.g., tetraethyl orthosilicate) and any other alkoxides.

Suitable application techniques for applying the coating formulation to the glass substrate may involve, for example, dip coating, drop coating, bar coating, slot-die coating, curtain coating, roll coating, spray coating, printing, etc. The kinematic viscosity of the formulation may be adjusted based on the particular application employed. Typically, however, the kinematic viscosity of the formulation is about 450 centistokes or less, in some embodiments from about 50 to about 400 centistokes, and in some embodiments, from about 100 to about 300 centistokes, as determined with a Zahn cup (#3), wherein the kinematic viscosity is equal to $11.7(t-7.5)$, where t is the efflux time (in seconds) measured during the test. If desired, viscosity modifiers (e.g., xylene) can be added to the formulation to achieve the desired viscosity.

Once applied, the coating formulation may be polymerized to form the interpenetrating network. The method of polymerization can be any as generally known in the art. For instance, polymerization may be via UV radiation, heating or a combination thereof. In one embodiment, only heating may be employed. In one embodiment, both UV radiation and heating may be employed to polymerize the various compounds. For instance, UV radiation may be employed to polymerize any acrylate compounds. Meanwhile, heating may be employed to form the crosslinked polyol and polysiloxane. Such heating and UV exposure may be simultaneous. Alternatively, the heating may be conducted first and the UV light may follow. Or, the UV exposure may be first and the heating may follow.

The coating formulation may be heated to polymerize and cure the polymerizable compounds. For example, the coating formulation may be cured at a temperature of from about 50° C. to about 350° C., in some embodiments from about 75° C. to about 325° C., in some embodiments from about 100° C. to about 300° C., in some embodiments from about 150° C. to about 300° C., and in some embodiments, from about 200° C. to about 300° C. for a period of time ranging from about 30 seconds to about 100 minutes, in some embodiments from about 30 seconds to about 50 minutes, in some embodiments from about 1 to about 40 minutes, and in some embodiments, from about 2 to about 15 minutes. Curing may occur in one or multiple steps. If desired, the coating formulation may also be optionally dried prior to curing to remove the solvent from the formulation. Such a pre-drying step may, for instance, occur at a temperature of from about 20° C. to about 150° C., in some embodiments from about 30° C. to about 125° C., and in some embodiments, from about 40° C. to about 100° C.

In addition to heating, as indicated above, other techniques may also be utilized to polymerize the compounds. For instance, with the presence of initiators, a UV light may be employed to polymerize the compounds.

The UV exposure may be conducted at an intensity and time period that allows for sufficient polymerization depending on the types of monomers. For instance, for certain acrylates, UV exposure at an intensity of about 15 mW/cm$^2$ or more, such as about 20 mW/cm$^2$ or more, such as about 25 mW/cm$^2$ or more, such as about 30 mW/cm$^2$ or more for a period of time ranging from about 30 seconds to about 100 minutes, in some embodiments from about 30 seconds to about 50 minutes, in some embodiments from about 1 to about 25 minutes, and in some embodiments from about 1 to about 10 minutes should be sufficient. In one embodiment, the UV exposure may be from 25 to 30 mW/cm$^2$ for a period of 5 minutes. In addition, UV exposure may be conducted in an inert atmosphere. For instance, the exposure may be conducted in the presence of argon gas or nitrogen gas. In one particular embodiment, the UV exposure is conducted in the presence of nitrogen gas.

If desired, the glass article may also be subjected to an additional heat treatment (e.g., tempering, heat bending, etc.) to further improve the properties of the article. The heat treatment (or tempering) may, for instance, occur at a temperature of from about 500° C. to about 800° C., and in some embodiments, from about 550° C. to about 750° C. The glass article may also undergo a high-pressure cooling procedure called "quenching." During this process, high-pressure air blasts the surface of the glass article from an array of nozzles in varying positions. Quenching cools the outer surfaces of the glass much more quickly than the center. As the center of the glass cools, it tries to pull back from the outer surfaces. As a result, the center remains in tension, and the outer surfaces go into compression, which gives tempered glass its strength.

The cured and/or tempered coating may have a thickness of about 1 micron or more, such as about 5 microns or more, such as about 10 microns or more, such as about 15 microns or more, such as about 25 microns or more, such as about 50 microns or more, such as about 75 microns or more to about 500 microns or less, such as about 250 microns or less, such as about 150 microns or less, such as about 100 microns or less, such as about 75 microns or less, such as about 60 microns or less, such as about 50 microns or less. The present inventors have discovered that they can provide thinner coatings with the present binder and comparable or even better properties in comparison to coatings containing only one or two binders. However, it should be understood that the thickness of the coating is not necessarily limited by the present invention.

While embodiments of the present disclosure have been generally discussed, the present disclosure may be further understood by the following, non-limiting examples.

EXAMPLES

Test Methods

Coating Thickness: The coated layer of as coated glass is removed by a razor. The step height of the coating is observed using a profilometer. The data is an average measured from three points at different positions.

Roughness: The topography is investigated by profilometer (T-7, KLA-Tencor). The scanning area is 5000 μm×5000 μm. The scanning speed is 20 μm/sec. The force of stylus on the surface is 5 mg and the scanning number is 30. The surface roughness is quantitatively characterized by measuring the arithmetic average roughness, Ra, and root mean square roughness, Rm. The roughness parameters are valid for an M×N rectangular sampling area with the lateral directions x and y and vertical direction z.

Organic Content: The organic content inside the coating of as coated glass is analyzed by burning powder (0.3-0.5 grams) scratched from as coated glass. The powder is burned at 650° C. for 30 minutes. The percentage of burned organic compound is calculated.

Cross-Hatch Adhesion: The cross-hatch adhesion is determined in accordance with ASTM D3359-09. For the test, cuts a certain distance apart are made in the coating depending on the thickness of the coating. Additionally, intersecting cuts are also made. Tape is placed on the grid area and within approximately 90 seconds of application, the tape is removed by pulling it off rapidly at as close to an angle of 180° as possible. The grid area is inspected for removal of coating from the substrate. The classifications go from 0B to 5B wherein 5B indicates that none of the squares of the lattice are detached. A value of less than 3B is indicative of a failure.

Solvent Resistance: The ability of a surface to resist solvents can be determined in accordance with ASTM D5402-15 using a MEK (methyl ethyl ketone) solvent. More particularly, the surface is rubbed with a cloth 300 times using a cloth containing the MEK solvent. A value of less than 100 is indicative of a failure.

Hoffman Hardness: The mechanical strength of as coated glass is evaluated by Hoffman hardness using a BYK Gardner tester with a weight rider of 10 g. A value of less than 10 is indicative of a failure. The test can be performed in accordance with GE E50TF61.

Stud Pull Strength: The adhesive strength of the coating can be evaluated by measuring the stud pull strength. The coating surface is blown with nitrogen gas. An aluminum dolly with a diameter of 20 mm is polished by sand paper (100 #). An aldehyde-amine condensate/organocopper compound mixture (Loctite 736) is sprayed on the surface of the coating and an aluminum stud. After 5 minutes, an acrylic adhesive (312) is added to the surface of the aluminum stud and it is glued to the surface of the coating with pressure until solid adhesion is achieved. The glued aluminum stud and glass are placed at room temperature for 3 hours. The dolly is pulled by a PosiTest AT with a pull rate of 30 psi/sec. The adhesive strength is measured by the PosiTest AT. A strength of less than 450 psi is considered a failure.

Corrosion Resistance: The ability of a surface to resist corrosion can be determined in accordance with ASTM B368-09 (2014), which is known as the Copper-Accelerated Acetic Acid-Salt Spray (Fog) Testing ("CASS" Test). During this test, samples are subjected to a salt fog containing laden copper ions and then examined for color change after 120 hours of exposure using the method described above.

Color Change: The color change of a surface may be determined using values known as "ΔE" and "ΔC", which are well understood in the art and can be determined in accordance with ASTM 2244-16. ΔE may, for instance, correspond to the CIE LAB Scale L*, a*, b*, wherein L* is (CIE 1976) lightness units; a* is (CIE 1976) red-green units; b* is (CIE 1976) yellow-blue units. For this scale, the distance between $L^*_0$ $a^*_0 b^*_0$ and $L^*_1 a^*_1 b^*_1$ is: $\Delta E = [(\Delta L^*)^2 + (\Delta a^*)^2 + (\Delta b^*)^2]^{1/2}$, where $\Delta L^* = L^*_1 - L^*_0$; $\Delta a^* = a^*_1 - a^*_0$; $\Delta b^* = b^*_1 - b^*_0$; the subscript "$_0$" represents the initial color of the article and the subscript "$_1$" represents the color of the article after a change in conditions (e.g., CASS testing); and the numbers employed (e.g., a*, b*, L*) are those calculated by the aforesaid (CIE LAB 1976) L*, a*, b* coordinate technique. Also, $\Delta C = [(\Delta a^*)^2 + (\Delta b^*)^2]^{1/2}$. When the coating-side ΔE or ΔC values are measured, then coating side a*, b* and L* values are used. Likewise, when glass side ΔE or ΔC values are measured, glass side a*, b* and L* values are used.

Acid/Base Resistance: The ability of a surface to resist acid/bases can be determined by soaking a sample in either a 2 wt. % HCl or 4 wt. % NaOH solution for a time period of about 180 minutes. The water contact angle may be measured at various points during the test (e.g., after 30, 60, or 180 minutes) to test the resistance of the surface.

Jetness: The jetness of the coating is evaluated using optical data, L*, a*, and b* values. The jetness is calculated using the following equation: Jetness=100[log(92.96/(X10/D65))+log(98.23/(Y10/D65))−log(106.28/(Z10/D65))]. The X10/D65, Y10/D65, and Z10/D65 values are data measured by the Hunter optical instrument and indicates the color change of a sample at the X, Y, and Z axis when incident light is 10 degrees and lamination light is daylight. Jetness is generally measured for tempered glass.

Opacity: The opacity of evaluated using a Perkin-Elmer (PE950) instrument. In particular, the coated side is faced to the spherical unit of the instrument.

Roughness: The topography is investigated by a profilometer in a scanning area of 5,000 microns by 5,000 microns and a scanning speed of 20 microns/second. The force of the stylus on the surface is 5 mg and the scanning number is 30. The surface roughness is quantitatively characterized by measuring the arithmetic average roughness and root mean square roughness.

Condenser chamber test: As coated and tempered glass are set in chamber at 45° C. and with 100% humidity for 21 days. L*, a* and b* before and after testing are measured with Hunter Pro X (RSEX mode). Both ΔE and ΔC should be less than 2 in order to pass the test. Meanwhile, adhesive strength of coated layer after testing is investigated by cross-hatch and no more 15% of film can be removed in order to pass test.

High temperature/humidity chamber test: Glass is placed in a chamber at 85° C. and with 85% humidity for 5 days. L*, a* and b* before and after testing are measured with Hunter Pro X (RSEX mode). Both ΔE and ΔC should be less than 2 in order to pass the test. Meanwhile, adhesive strength of coated layer after testing is investigated by cross-hatch and no more 15% of film can be removed in order to pass test.

Brush test: The brush test is based on the procedure of TP-208-A (Guardian). 2"×8" glass is mounted on a brush test bath filled with De-ion water. The cycle number of brush is 500. The glass surface is observed by a microscope after the brush test. The change of Tvis %, Tuv % and H % are evaluated by ΔTvis %, ΔTuv % and ΔH % calculated by before and after brush test Ammonium solution test: Glass is soaked in ammonium solution (10 vol. %) for 3 days at room temperature. Glass is removed from solution, washed by De-ion water and dried with $N^2$ gas. The stability of film is evaluated by ΔTvis % and ΔTuv % measured by substring Tvis % and Tuv % of glass before and after testing.

Water Contact Angle: The water contact angle may be measured with a contact angle instrument (FTA 135) at room temperature. One sessile drop of deionized water (approximately 2.3 microliters) is wetted on the surface and the contact angle is immediately measured. The data is the average of three points on the glass. The calculation of the contact angle is performed by software.

Differential Scanning calorimetry: 50 mg of glass frit is set in one ceramic pan of DSC instrument (Mettler Toledo DSC 1 Star system). Working gas of DSC test is nitrogen and the tested temperature range is heated from 40° C. to 700° C. with a heating rate as 10° C./min, then cooled from 700° C. to 40° C. with 10° C./min.

Scanning Electron Microscopy: The morphologies of tempered glass are observed by Hitachi S4800 field emission SEM. The working distance is 4.0 mm and 6.7 mm for images with top surface and rotated position (45 degree). There is tungsten coated layer with thickness of 5 to 10 nm on the surface of samples. The accelerating voltage is 5 kV.

Cutting Oil: A sample is placed in mineral oil at room temperature for 1 day. Once removed, L*, a*, and b* of the sample is measured before and after testing and ΔE and ΔC are calculated. The adhesive strength of the coated layer is evaluated by cross-hatch test. A sample will consider to have passed if both delta values are less than 1 and cross-hatch is equal to or larger than 3B.

Ultrasonic Testing: A sample with a size of 4 inches by 8 inches is immersed in deionized water and exposed to an ultrasonic for 60 minutes at room temperature. If there are no damages on the coated layer, the samples are considered to pass.

Thermal Dwell Test: "As coated" glass is placed in an oven at 60° C. for 7 days. L*, a*, and b* of the sample is measured before and after testing and ΔE and ΔC are calculated. The adhesive strength of the coated layer is evaluated by cross-hatch test. A sample will consider to have passed if both delta values are less than 1 and cross-hatch is equal to or larger than 3B.

Thermal Stability Test: Tempered glass is placed in an oven at 650° C. for 16 minutes. L*, a*, and b* of the sample is measured before and after testing and ΔE and ΔC are calculated. A sample will consider to have passed if both delta values are less than 1.

Example 1

A coating formulation containing a glass frit including a non-crosslinked binder and polymerizable compounds for the formation of an interpenetrating polymer network was applied to one surface of a glass substrate.

The polymer binder comprises three parts: the first binder comes from melamine-polyol resin, the second binder comes from silane and last binder comes from epoxy acrylate. The binder formulation can be prepared by adding the melamine-formaldehyde, the epoxy acrylate oligomer, the ethoxylated trimethylolpropane triacylate, and polyol to a 100 mL glass jar. Then, the xylene and butanol can be added separately. Finally, the p-toluene sulfuric acid and silane solution are added. The solution is mixed by stir bar for 1 hour at room temperature. The binder formulation is provided in the table below.

| Chem. (421-81-3) | Amt. |
| --- | --- |
| Melamine-formaldehyde (g) | 2.5 |
| Epoxy acrylate oligomer (g) | 21.25 |
| Polyol (g) | 1.25 |
| p-toluene sulfuric acid (g) | 0.1 |
| Xylene (mL) | 5 |
| Butanol (mL) | 5 |
| Ethoxylated trimethylolpropane triacrylate (g) | 2 |
| Total | 37.1 |
| Silane solution (421-37-1) | 37.1 |

The silane solution mentioned above is prepared by the formulation in the table below and the procedure is as follows. To a 100 ml of glass jar, the n-propanol and n-butanol along with the deionized water are added separately. The solution is mixed at room temperature. Then, to this glass jar, the 3-glycidoxyporpyltrimethoxysilane, phenytriethoxysilane, hexyltrimethylsilane and tetraethoxysilane are added subsequently. Finally, the IPA-ST-UP is added and the solution is immediately mixed by stir bar after acetic acid is added. The solution is further stirred at room temperature for 24 hours before using.

| Chem. (421-37-1) | M.W (g/mol) | Wt., g |
| --- | --- | --- |
| n-propanol | 60.09 | 22.10 |
| n-butanol | 74.12 | 12.66 |
| De-ionized water | 18.00 | 3.41 |
| 3-Glycidoxypropyltrimethoxysilane (~99%) | 236.34 | 22.83 |
| Phenytriethoxysilane (100%) | 240.40 | 0.67 |
| Hexyltrimethylsilane (100%) | 206.35 | 0.67 |
| Tetraethoxysilane (100%) | 208.33 | 1.33 |
| Colloidal Silica in iso-propyl alcohol (IPA-ST-UP), ~15% of nanoparticles | — | 21.33 |
| Acetic acid | 60.05 | 0.40 |
| Total | — | 85.46 |

The formulations are prepared by mixing the binder with the appropriate amount of Fenzi white paint. The Fenzi white paint included an acrylonitrile styrene acrylate polymer wherein the acrylate included methyl methacrylate and ethyl methacrylate.

In forming the formulation, the white paint and lab binder are combined and then the solution is mixed by ball milling for 0.5 hours.

| | Control | | Mixed enamel from Fenzi control and lab binder | | | | |
| --- | --- | --- | --- | --- | --- | --- | --- |
| Chem., | 424-75-1 | 424-71-5 | 424-75-2 | 424-75-3 | 424-75-4 | 424-78-1 | 424-78-2 |
| Fenzi white paint (g) | 20 | 20 | 19.5 | 19 | 18 | 18 | 19 |
| Binder (421-81-3), ml | 0 | 0 | 0.5 | 1 | 2 | 2 | 1 |
| wt. % of Binder | 0 | 0 | 2.3 | 4.6 | 9.2 | 9.2 | 4.6 |

"As coated" glass is prepared using a glass with size as 8"×12" and a thickness of 4 mm. The glass is washed by 1% of $CeO_2$ solution and rinsed by tap water. Then, the glass is washed by soap and thoroughly rinsed by De-ion water. Finally, glass is dried by $N_2$ gas. The glass is coated using a coating machine (BYK) and a bird bar with sizes as 3 mil is set in front of glass. The coating speed is set as 100 mm/sec. The coated glass is immediately moved to the oven to be cured at 260° C. for 24 min to create "as coated" glass. "As coated" glass should demonstrate certain green strength and may be further fabricated without damage on surface. Finally, "as coated" glass is heated at the oven with 680° C. for 14 min to develop tempered glass. Tempered glass should show excellent adhesive and mechanical strength. During tempered process, glass frits will be melted and adhered on glass plate strongly.

Once formed, tempered glass was observed under SEM. In particular a cross-section was analyzed and a pore structure was noted having a pore size of from 0.1 to 10 microns, such as from 0.5 to 7 microns, such as from 1 to 5 microns. In addition, channels were also observed.

Also, the organic content and the mechanical properties of the coating were determined, the results of which are provided in the table below.

|  | Control | | Mixed enamel from Fenzi control and lab binder | | | | |
|---|---|---|---|---|---|---|---|
| Chem., | 424-75-1 | 424-71-5 | 424-75-2 | 424-75-3 | 424-75-4 | 424-78-1 | 424-78-2 |
| Lab binder, wt. % | 0 | 0 | 2.3 | 4.6 | 9.2 | 4.6 | 9.2 |
| Org. wt. % | 6.9 | 9.17 | 8.78 | 10.05 | 12.09 | 10.12 | 12.69 |
| Thickness (μm) | 65.6 | 71.7 | 77.5 | 66.36 | 71.59 | 61.5 | 59.8 |
| Cross-hatch | 2B-3B | 2B | 3B | 3B | 4B | 4B | 4B |
| Stud pull (psi) | 262 | 142 | 461 | 585 | 1220 | 527 | 1017 |
| Hoffman | 15 | 6 | 17 | >20 | >20 | 16 | 17 |
| MEK rub | ~100 | 15 | ~100 | ~100 | >500 | >100 | >300 |
| Opacity %* | 8.03 | — | — | — | — | 5.21 | 8.09 |

In this example, improved performance was observed using the lab binder to form the interpenetrating network. This allowed for an improvement in chemical resistance. In addition, the hydrolyzed silane could effectively bond to the surface of the glass via the hydroxyl groups by which the adhesive strength of the glass, in particular "as coated" glass, could be enhanced as indicated by the stud pull data. In addition, the Antiscratch properties of the coated layer could be enhanced as indicated by the Hoffman tests.

Example 2

A coating formulation containing a glass frit including a non-crosslinked binder and polymerizable compounds for the formation of an interpenetrating polymer network was applied to one surface of a glass substrate.

The polymer binder comprises three parts: the first binder comes from melamine-polyol resin, the second binder comes from silane and last binder comes from epoxy acrylate. The binder formulation can be prepared by adding the melamine-formaldehyde, the epoxy acrylate oligomer, the ethoxylated trimethylolpropane triacylate, and polyol to a 100 mL glass jar. Then, the xylene and butanol can be added separately. Finally, the p-toluene sulfuric acid and silane solution are added. The solution is mixed by stir bar for 1 hour at room temperature. The binder formulation is provided in the table below.

| Chem. (421-81-3) | Amt. |
|---|---|
| Melamine-formaldehyde (g) | 2.5 |
| Epoxy acrylate oligomer (g) | 21.25 |
| Polyol (g) | 1.25 |
| p-toluene sulfuric acid (g) | 0.1 |
| Xylene (mL) | 5 |
| Butanol (mL) | 5 |
| Ethoxylated trimethylolpropane triacrylate (g) | 2 |
| Total | 37.1 |
| Silane solution (421-37-1) | 37.1 |

The silane solution mentioned above is prepared by the formulation in the table below and the procedure is as follows. To a 100 ml of glass jar, the n-propanol and n-butanol along with the deionized water are added separately. The solution is mixed at room temperature. Then, to this glass jar, the 3-glycidoxyporpyltrimethoxysilane, phenytriethoxysilane, hexyltrimethylsilane and tetraethoxysilane are added subsequently. Finally, the IPA-ST-UP is added and the solution is immediately mixed by stir bar after acetic acid is added. The solution is further stirred at room temperature for 24 hours before using.

| Chem. (421-37-1) | M.W (g/mol) | Wt., g |
|---|---|---|
| n-propanol | 60.09 | 22.10 |
| n-butanol | 74.12 | 12.66 |
| De-ionized water | 18.00 | 3.41 |
| 3-Glycidoxypropyltrimethoxysilane (~99%) | 236.34 | 22.83 |
| Phenytriethoxysilane (100%) | 240.40 | 0.67 |
| Hexyltrimethylsilane (100%) | 206.35 | 0.67 |
| Tetraethoxysilane (100%) | 208.33 | 1.33 |
| Colloidal Silica in iso-propyl alcohol (IPA-ST-UP), ~15% of nanoparticles | — | 21.33 |
| Acetic acid | 60.05 | 0.40 |
| Total | — | 85.46 |

A black pigment slurry is prepared by adding a surfactant, PEG 1900, to a solvent mixture of xylene and butanol. Then, pigment (V-7709) (CrCuO$_2$) is added and the slurry is dispersed for 5 min at room temperature and mixed in one ball mill (US Stoneware) for 3 days. Table 1 lists the formulation of pigment slurry used in this study.

| Chem. (417-85-5) | wt., g |
|---|---|
| Xylene | 8.6 |
| Butanol | 8.1 |
| Pigment (V-7709) | 40 |
| PEG1900 | 0.7 |
| Total | 57.4 |

The entire binder is prepared by mixing the lab binder with the silane binder and polystyrene-methyl methacrylate copolymer having a weight average molecular weight of 150,000 g/mol.

|  | Wt., g | | | |
|---|---|---|---|---|
| Chem., | 429-35-1 | 429-35-2 | 429-35-4 | 429-35-3 |
| PSMMA, 20% | 8 | 6 | 5 | 4 |
| 421-81-3 | 1 | 3 | 4 | 5 |
| 421-37-1 | 1 | 1 | 1 | 1 |
|  | wt., g | | | |
| PSMMA | 1.6 | 1.2 | 1 | 0.8 |
| Epoxy and melamine binder | 0.72 | 2.16 | 2.88 | 3.6 |
| Silane | 0.33 | 0.33 | 0.33 | 0.33 |
| total | 2.65 | 3.69 | 4.21 | 4.73 |

| Chem., | Wt., g | | | |
|---|---|---|---|---|
| | 429-35-1 | 429-35-2 | 429-35-4 | 429-35-3 |
| | Wt. % | | | |
| PSMMA | 60.38 | 32.52 | 23.75 | 16.91 |
| Epoxy and melamine binder | 27.17 | 58.54 | 68.41 | 76.11 |
| Silane | 12.45 | 8.94 | 7.84 | 6.98 |
| total | 100 | 100 | 100 | 100 |

The enamel is prepared by mixing the binder with the appropriate amount of glass frit and pigment slurry. In particular, the glass frit and pigment slurry are added to a glass jar. Then, the ternary binder and an initiator solution along with PEG 1900 are added. The initiator solution is prepared by dissolving 0.25 g of benzoyl peroxide into 10 ml of xylene. Enamel is ground by ball mill (US Stoneware) and five cubic aluminum type of grading media is used (US Stoneware Brun 050-90). For the best application, ball mill time is at least 3 days.

| Chem. | 429-42-1 | 429-42-2 | 429-42-3 | 429-59-1 | 429-59-2 | 429-59-3 |
|---|---|---|---|---|---|---|
| AGC frit (ASF-2511C) (g) | 15.7 | 15.7 | 15.7 | 15.7 | 15.7 | 15.7 |
| JM frit (DT-30851) (g) | 0.3 | 0.3 | 0.3 | 0.3 | 0.3 | 0.3 |
| | 429-35-1 | 429-35-2 | 429-35-3 | 429-35-4 | 429-35-4 | 429-35-4 |
| Binder with PSMMA (g) | 6 | 6 | 6 | 4 | 5 | 6 |
| Black slurry (417-85-5) (g) | 5 | 5 | 5 | 5 | 5 | 5 |
| initiator, 421-36-7 (mL) | 0.2 | 0.2 | 0.2 | 0.2 | 0.2 | 0.2 |
| PEG1900 (g) | 0.2 | 0.2 | 0.2 | 0.2 | 0.2 | 0.2 |
| Cal. Solid binder (g) | — | — | — | 1.89 | 2.37 | 2.84 |

"As coated" glass is prepared using a glass with size as 8"×12" and a thickness of 4 mm. The glass is washed by 1% of $CeO_2$ solution and rinsed by tap water. Then, the glass is washed by soap and thoroughly rinsed by De-ion water. Finally, glass is dried by $N_2$ gas. The glass is coated using a coating machine (BYK) and a bird bar with sizes as 3 mil is set in front of glass. The coating speed is set as 100 mm/sec. The coated glass is immediately moved to the oven to be cured at 260° C. for 24 min to create "as coated" glass. "As coated" glass should demonstrate certain green strength and may be further fabricated without damage on surface. Finally, "as coated" glass is heated at the oven with 680° C. for 14 min to develop tempered glass. Tempered glass should show excellent adhesive and mechanical strength. During tempered process, glass frits will be melted and adhered on glass plate strongly.

The glass was also tested for mechanical and chemical performance. The results are as follows:

| | 429-59-1 | 429-59-2 | 429-59-3 |
|---|---|---|---|
| CASS | ΔE - 0.75 | ΔE - 0.56 | ΔE - 0.49 |
| | ΔC - 0.45 | ΔC - 0.43 | ΔC - 0.45 |
| | 5B | 5B | 5B |
| | 429-59-1 | 429-59-2 | 429-59-3 |
| Condenser chamber test | ΔE - 1.68 | ΔE - 1.08 | ΔE - 1.58 |
| | ΔC - 0.75 | ΔC - 0.68 | ΔC - 1.01 |
| | 4B | 3B | 3B |
| Water contact angle | 99.2 | 101.975 | 95.3 |

In addition, surface roughness measurements were obtained. The results are as follows:

| ID | Epoxy and melamine resin % | PSMMA % | $R_m$, μm | $R_a$, μm |
|---|---|---|---|---|
| 429-42-1 | 27.17 | 60.38 | 1.605 | 1.254 |
| 429-42-2 | 58.54 | 32.52 | 2.17 | 1.7 |
| 429-42-3 | 76.11 | 16.91 | 3.1 | 2.37 |

Example 3

A coating formulation containing a glass frit including a non-crosslinked binder and polymerizable compounds for the formation of an interpenetrating polymer network was applied to one surface of a glass substrate.

The polymer binder comprises three parts: the first binder comes from melamine-polyol resin, the second binder comes from silane and last binder comes from epoxy acrylate. The binder formulation can be prepared by adding the melamine-formaldehyde, the epoxy acrylate oligomer, the ethoxylated trimethylolpropane triacylate, and polyol to a 100 mL glass jar. Then, the xylene and butanol can be added separately. Finally, the p-toluene sulfuric acid and silane solution are added. The solution is mixed by stir bar for 1 hour at room temperature. The binder formulation is provided in the table below.

| Chem. (421-81-3) | Amt. |
|---|---|
| Melamine-formaldehyde (g) | 2.5 |
| Epoxy acrylate oligomer (g) | 21.25 |
| Polyol (g) | 1.25 |
| p-toluene sulfuric acid (g) | 0.1 |
| Xylene (mL) | 5 |

-continued

| Chem. (421-81-3) | Amt. |
|---|---|
| Butanol (mL) | 5 |
| Ethoxylated trimethylolpropane triacrylate (g) | 2 |
| Total | 37.1 |
| Silane solution (421-37-1) | 37.1 |

The silane solution mentioned above is prepared by the formulation in the table below and the procedure is as follows. To a 100 ml of glass jar, the n-propanol and n-butanol along with the deionized water are added separately. The solution is mixed at room temperature. Then, to this glass jar, the 3-glycidoxyporpyltrimethoxysilane, phenytriethoxysilane, hexyltrimethylsilane and tetraethoxysilane are added subsequently. Finally, the IPA-ST-UP is added and the solution is immediately mixed by stir bar after acetic acid is added. The solution is further stirred at room temperature for 24 hours before using.

| Chem. (421-37-1) | M.W (g/mol) | Wt., g |
|---|---|---|
| n-propanol | 60.09 | 22.10 |
| n-butanol | 74.12 | 12.66 |
| De-ionized water | 18.00 | 3.41 |
| 3-Glycidoxypropyltrimethoxysilane (~99%) | 236.34 | 22.83 |
| Phenytriethoxysilane (100%) | 240.40 | 0.67 |
| Hexyltrimethylsilane (100%) | 206.35 | 0.67 |
| Tetraethoxysilane (100%) | 208.33 | 1.33 |
| Colloidal Silica in iso-propyl alcohol (IPA-ST-UP), ~15% of nanoparticles | — | 21.33 |
| Acetic acid | 60.05 | 0.40 |
| Total | — | 85.46 |

A black pigment slurry is prepared by adding a surfactant, PEG 1900, to a solvent mixture of xylene and butanol. Then, pigment (V-7709) ($CrCuO_2$) is added and the slurry is dispersed for 5 min at room temperature and mixed in one ball mill (US Stoneware) for 3 days. Table 1 lists the formulation of pigment slurry used in this study.

| Chem. (417-85-5) | wt., g |
|---|---|
| Xylene | 8.6 |
| Butanol | 8.1 |
| Pigment (V-7709) | 40 |
| PEG1900 | 0.7 |
| Total | 57.4 |

The enamel is prepared by mixing the binder with the appropriate amount of glass frit and pigment slurry. In particular, the glass frit and pigment slurry are added to a glass jar. Then, the ternary binder and an initiator solution along with PEG 1900 are added. The initiator solution is prepared by dissolving 0.25 g of benzoyl peroxide into 10 ml of xylene. Enamel is ground by ball mill (US Stoneware) and five cubic aluminum type of grading media is used (US Stoneware Brun 050-90). For the best application, ball mill time is at least 3 days.

| Chem. | wt., g |
|---|---|
| Ferro glass frit (GAL-56218) | 72 |
| Pigment slurry (417-85-5) | 22.5 |
| Binder (421-81-3) | 27 |
| Initiator (421-36-7) | 0.9 |
| PEG1900 | 1.12 |

"As coated" glass is prepared using a glass with size as 8"×12" and a thickness of 4 mm. The glass is washed by 1% of $CeO_2$ solution and rinsed by tap water. Then, the glass is washed by soap and thoroughly rinsed by De-ion water. Finally, glass is dried by $N_2$ gas. The glass is coated using a coating machine (BYK) and a bird bar with sizes as 3 mil is set in front of glass. The coating speed is set as 100 mm/sec. The coated glass is immediately moved to the oven to be cured at 260° C. for 24 min to create "as coated" glass. "As coated" glass should demonstrate certain green strength and may be further fabricated without damage on surface. Finally, "as coated" glass is heated at the oven with 680° C. for 14 min to develop tempered glass. Tempered glass should show excellent adhesive and mechanical strength. During tempered process, glass frits will be melted and adhered on glass plate strongly.

Once formed, the organic content and the mechanical properties of the coating were determined, the results of which are provided in the table below.

| ID | 421-153-3 (2M) (1 mil bar) | 421-153-3 (4M) (2 mil bar) | 421-153-3 (3M) (3 mil bar) | Fenzi D20 |
|---|---|---|---|---|
| | | As coated | | |
| Org. % | | 7.33 | | 9.27 |
| Thickness (μm) | 23.83 | 49.96 | 69.17 | 34.5 |
| Stud pull (psi) | 592 | 631 | 646 | 229 |
| Cross-hatch | 5B | 5B | 5B | 3B |
| Hoffman | 7 | 13 | 18.5 | 5 |
| MEK | >100 | >100 | >100 | 50 |
| Ultrasonic (min) | >60 | >60 | >60 | pass |
| Cutting oil, 1 day | ΔE = 0.16 ΔC = 0.07; 5B | ΔE = 0.164 ΔC = 0.06; 5B | ΔE = 0.54 ΔC = 0.10; 5B | N/A |
| Thermal dwell, 7 days | ΔE = 0.15 ΔC = 0.13; 5B | ΔE = 0.86 ΔC = 0.26; 5B | ΔE = 0.13 ΔC = 0.08; 5B | N/A |
| CASS, 5 days | ΔE = 3.91 ΔC = 1.40; 0B | ΔE = 0.34 ΔC = 0.059; 5B | ΔE = 3.03 ΔC = 1.10; 0B | N/A |
| Condenser chamber, 21 days | ΔE = 1.05 ΔC = 0.79; 5B, 5 | ΔE = 3.88 ΔC = 1.29; 5B, 9 | ΔE = 1.85 ΔC = 0.96; 5B, 13 | N/A |

-continued

| ID | 421-153-3 (2M) (1 mil bar) | 421-153-3 (4M) (2 mil bar) | 421-153-3 (3M) (3 mil bar) | Fenzi D20 |
|---|---|---|---|---|
| Brush, 500 cycle | Pass | Pass | Pass | N/A |
| Water contact angle | 105 | 110 | 103 | 107 |
| Tempered glass | | | | |
| Jetness | 253 | 250 | 251 | 260 |
| Water contact angle | 40 | 40 | 46 | — |
| Roughness, Rm (μm) | — | — | — | 0.14 |
| 85° C./85H chamber, 5 days | ΔE = 0.14<br>ΔC = 0.09 | ΔE = 0.37<br>ΔC = 0.29 | ΔE = 0.21<br>ΔC = 0.19 | N/A |
| Condenser chamber, 21 days | ΔE = 0.19<br>ΔC = 0.06 | ΔE = 0.24<br>ΔC = 0.12 | ΔE = 0.15<br>ΔC = 0.11 | N/A |
| Thermal stability | ΔE = 0.13<br>ΔC = 0.09 | ΔE = 0.10<br>ΔC = 0.09 | ΔE = 0.25<br>ΔC = 0.13 | N/A |
| Ammonium 10%, 3 days | ΔE = 0.14<br>ΔC = 0.07 | ΔE = 0.14<br>ΔC = 0.10 | ΔE = 0.26<br>ΔC = 0.16 | N/A |
| Brush, 500 cycle | Pass | Pass | Pass | N/A |
| Enamel | | | | |
| Surface tension (dyn/cm) | | 37.5 | | 30.1 |
| Viscosity, 23° C. and #3 (cp) | | 44 | | 2100 |
| Density (g/cm$^3$) | — | — | — | 2 |
| Solid % | — | — | — | 83 |

The roughness of the tempered glass was also determined. The results are provided in the table below. The thickness is lower than the "as coated" glass because of the decomposition of the polymer binder and thus shrinkage of the coating.

| ID | Thickness of coated layer in tempered glass, μm | $R_a$, μm | $R_m$, μm |
|---|---|---|---|
| 421-153-3-2M | 12.86 | 1.73 | 1.32 |
| 421-153-3-4M | 28.73 | 1.38 | 1.07 |
| 421-153-3-3M | 40.6 | 1.12 | 0.91 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A coated glass substrate comprising:
a coating provided on a surface of a glass substrate, the coating comprising a semi-interpenetrating polymer network including a non-crosslinked polymer comprising an acrylate copolymer, a styrene polymer, a styrene copolymer, or a mixture thereof and a glass frit,
wherein the coating exhibits a stud pull of about 275 psi or more.

2. The coated glass substrate of claim 1, wherein the coating exhibits a stud pull of about 500 psi or more.

3. The coated glass substrate of claim 1, wherein the coating exhibits a ΔE value of about 4 or less after being exposed to a copper-accelerated acetic acid-salt spray ("CASS") in accordance with ASTM B368-09 (2014).

4. The coated glass substrate of claim 1, wherein the coated glass substrate exhibits a Hoffman hardness of 15 or more.

5. The coated glass substrate of claim 1, wherein the glass frit contains bismuth oxide or titanium dioxide.

6. The coated glass substrate of claim 1, wherein the coating contains organic material in an amount of from about 1 wt. % to about 11 wt. %.

7. The coated glass substrate of claim 1, wherein the non-crosslinked polymer comprises a linear polymer.

8. The coated glass substrate of claim 1, wherein the non-crosslinked polymer comprises an acrylate copolymer.

9. The coated glass substrate of claim 8, wherein the acrylate copolymer comprises an acrylate-styrene-acrylonitrile copolymer.

* * * * *